US012759877B2

(12) United States Patent
Yamamoto et al.

(10) Patent No.: US 12,759,877 B2
(45) **Date of Patent: *Oct. 13, 2026**

(54) BORON NITRIDE PARTICLE, BORON NITRIDE POWDER, RESIN COMPOSITION, AND RESIN COMPOSITION PRODUCTION METHOD

(71) Applicant: Denka Company Limited, Tokyo (JP)

(72) Inventors: Mana Yamamoto, Tokyo (JP); Kenji Miyata, Tokyo (JP); Yusuke Sasaki, Tokyo (JP)

(73) Assignee: Denka Company Limited, Tokyo (JP)

( * ) Notice: Subject to any disclaimer, the term of this patent is extended or adjusted under 35 U.S.C. 154(b) by 627 days.

This patent is subject to a terminal disclaimer.

(21) Appl. No.: 18/040,588

(22) PCT Filed: Aug. 19, 2021

(86) PCT No.: PCT/JP2021/030451
§ 371 (c)(1),
(2) Date: Feb. 3, 2023

(87) PCT Pub. No.: WO2022/039240
PCT Pub. Date: Feb. 24, 2022

(65) Prior Publication Data

US 2024/0253989 A1 Aug. 1, 2024

(30) Foreign Application Priority Data

Aug. 20, 2020 (JP) ................................ 2020-139486

(51) Int. Cl.
*C01B 21/064* (2006.01)
*C08K 3/38* (2006.01)

(52) U.S. Cl.
CPC ........... *C01B 21/0648* (2013.01); *C08K 3/38* (2013.01); *C01P 2002/74* (2013.01);
(Continued)

(58) Field of Classification Search
CPC ..... C01B 21/0648; C01B 21/064; C08K 3/38; C08K 2003/385; C08K 2201/004;
(Continued)

(56) References Cited

U.S. PATENT DOCUMENTS

| | | | |
|---|---|---|---|
| 2014/0349105 A1 | 11/2014 | Yamazaki et al. | |
| 2015/0152251 A1 | 6/2015 | Koshida et al. | |

(Continued)

FOREIGN PATENT DOCUMENTS

| | | |
|---|---|---|
| CN | 104470873 A | 3/2015 |
| CN | 105947997 A | 9/2016 |

(Continued)

OTHER PUBLICATIONS

Arslan et al, "Multiwalled boron nitride microtubes (BNMTs) shielding in thermal neutron absorbing", Radiation Effects & Defects in Solids: Incorporating Plasma Techniques & Plasma Phenomena, 173(7/8), 555-566 (Year: 2018).*

(Continued)

*Primary Examiner* — Anthony J Zimmer
(74) *Attorney, Agent, or Firm* — Leydig, Voit & Mayer, Ltd.

(57) ABSTRACT

A boron nitride particle having a long and thin shape, in which, when the boron nitride particle is subjected to a loading and unloading test comprising a loading step and unloading step in this order, at least a part of a length in the lateral direction of the boron nitride particle compressed in the loading step returns in the unloading step, in which the loading step includes gradually applying a load from 0.2 mN up to 20 mN at a loading rate of 0.27 mN/second in a lateral direction of the boron nitride particle to compress the boron nitride particle, and the unloading step includes gradually unloading the boron nitride particle to 0.2 mN at an unloading rate of 0.27 mN/second.

12 Claims, 4 Drawing Sheets

(52) U.S. Cl.
CPC ...... *C01P 2004/03* (2013.01); *C01P 2004/45* (2013.01); *C01P 2006/90* (2013.01); *C08K 2003/385* (2013.01); *C08K 2201/004* (2013.01)

(58) Field of Classification Search
CPC .............. C01P 2002/74; C01P 2004/03; C01P 2004/45; C01P 2006/90; C08L 101/00
See application file for complete search history.

(56) References Cited

U.S. PATENT DOCUMENTS

| | | | |
|---|---|---|---|
| 2016/0060112 | A1 | 3/2016 | Nishi et al. |
| 2018/0029942 | A1 | 2/2018 | Ishida et al. |
| 2019/0276310 | A1 | 9/2019 | Liu et al. |
| 2020/0032064 | A1 | 1/2020 | Kawahara et al. |
| 2021/0363399 | A1 | 11/2021 | Yamazaki et al. |

FOREIGN PATENT DOCUMENTS

| | | | | | |
|---|---|---|---|---|---|
| CN | 107207364 | A | | 9/2017 | |
| CN | 107673318 | A | * | 2/2018 | ........... C01B 21/064 |
| CN | 109704296 | A | | 5/2019 | |
| CN | 110198990 | A | | 9/2019 | |
| CN | 110817814 | A | * | 2/2020 | ............. C01B 3/001 |
| JP | 2008-214130 | A | | 9/2008 | |
| JP | 2016-160134 | A | | 9/2016 | |
| JP | 2019-043792 | A | | 3/2019 | |
| WO | WO 2014/136959 | A1 | | 9/2014 | |
| WO | WO 2018/139644 | A1 | | 8/2018 | |
| WO | WO 2020/090240 | A1 | | 5/2020 | |
| WO | Wo 2020/175377 | A1 | | 9/2020 | |

OTHER PUBLICATIONS

Huang et al., "Thin-walled boron nitride microtubes exhibiting intense band-edge UV emission at room temperature", Nanotechnology 20 (2009) 085705 (Year: 2009).*
State Intellectual Property Office, Office Action issued in Chinese Patent Application No. 202180035668.8 (Oct. 31, 2023).
The International Bureau of WIPO, International Preliminary Report on Patentability in International Application No. PCT/JP2021/030451 (Mar. 2, 2023).
Japan Patent Office, International Search Report issued in International Application No. PCT/JP2021/030451 (Oct. 12, 2021).
Japan Patent Office, Office Action issued in Japanese Patent Application No. 2022-544005 (Oct. 18, 2022).

* cited by examiner

BORON NITRIDE PARTICLE, BORON NITRIDE POWDER, RESIN COMPOSITION, AND RESIN COMPOSITION PRODUCTION METHOD

CROSS-REFERENCE TO RELATED APPLICATIONS

This patent application is the U.S. national phase of International Application No. PCT/JP2021/030451, filed on Aug. 19, 2021, which claims the benefit of Japanese Patent Application No. 2020-139486, filed Aug. 20, 2020, the disclosures of which are incorporated herein by reference in their entireties for all purposes.

TECHNICAL FIELD

The present disclosure relates to a boron nitride particle, a boron nitride powder, a resin composition, and a method for producing a resin composition.

BACKGROUND ART

Boron nitride has lubricity, high thermal conductivity and insulating properties and is in use for a variety of uses such as solid lubricating materials, releasing materials, cosmetic raw materials, heat dissipation materials and sintered products having heat resistance and insulating properties.

For example, as a hexagonal boron nitride powder that is loaded into a resin to be capable of imparting high thermal conductivity and high dielectric strength to a resin composition to be obtained, Patent Literature 1 discloses a hexagonal boron nitride powder in which an agglomerated particle composed of the primary particles of hexagonal boron nitride is contained, the BET specific surface area is 0.7 to 1.3 $m^2/g$ and an oil absorption that is measured based on JIS K 5101-13-1 is 80 g/100 g or less.

CITATION LIST

Patent Literature

[Patent Literature 1] Japanese Unexamined Patent Publication No. 2016-160134

SUMMARY OF INVENTION

Technical Problem

According to the present inventors' studies, in a case where a boron nitride particle is used in, for example, a heat dissipation material (heat dissipation sheet), the boron nitride particle desirably has a long and thin shape in order to enhance the thermal conductivity in a specific direction. In addition, in a case where a boron nitride particle is mixed with a resin and molded into a sheet shape to be used as a heat dissipation material, there are cases where the boron nitride particle deforms due to a load being applied to the boron nitride particle during the mixing with the resin or the molding into the heat dissipation material, but it is desirable that the boron nitride particle returns to the original shape or a shape that is as similar to the original shape as possible when the load is released.

A main objective of the present invention is to provide a new boron nitride particle and a new boron nitride powder.

Solution to Problem

One aspect of the present invention is a boron nitride particle having a long and thin shape, in which, when the boron nitride particle is subjected to a loading and unloading test including a loading step and unloading step in this order, at least a part of a length in the lateral direction of the boron nitride particle compressed in the loading step returns in the unloading step, in which the loading step includes gradually applying a load from 0.2 mN up to 20 mN at a loading rate of 0.27 mN/second in a lateral direction of the boron nitride particle to compress the boron nitride particle, and the unloading step includes gradually unloading the boron nitride particle to 0.2 mN at an unloading rate of 0.27 mN/second.

$D_2/D_1$ may be 0.2 or more, in which $D_1$ is an amount of the boron nitride particle displaced in the lateral direction in the loading step, and $D_2$ is an amount of the boron nitride particle displaced in the lateral direction in the unloading step.

The boron nitride particle may have a shell part formed of boron nitride and a hollow part surrounded by the shell part.

Another aspect of the present invention is a boron nitride powder that is an aggregate of boron nitride particles each having a long and thin shape, in which, when the boron nitride powder is subjected to a loading and unloading test including the following steps (1) to (3) in this order, at least a part of a length in the lateral direction of the boron nitride particles B compressed in the loading step returns in the unloading step:

(1) a calculation step of measuring a magnitude of a load necessary to crush each of 10 boron nitride particles A that are selected from the boron nitride powder by applying a load at a loading rate of 0.27 mN/second in a lateral direction of the boron nitride particle A and calculating an average value F of the magnitudes of the loads, (2) a loading step of gradually applying a load from 0.2 mN up to a magnitude of 50% of the average value F of the magnitudes of the loads at a loading rate of 0.27 mN/second in a lateral direction of a boron nitride particle B that is selected from the boron nitride powder separately from the boron nitride particle A to compress the boron nitride particle B, and (3) an unloading step of gradually unloading the boron nitride particle B to 0.2 mN at an unloading rate of 0.27 mN/second.

$D_4/D_3$ may be 0.2 or more, in which $D_3$ is an average value of amounts of the boron nitride particle B displaced in the lateral direction in the loading step, and $D_4$ is an average value of amounts of the boron nitride particle B displaced in the lateral direction in the unloading step.

The boron nitride powder may be an aggregate of boron nitride particles each have a shell part formed of boron nitride and a hollow part surrounded by the shell part.

Still another aspect of the present invention is a resin composition containing the boron nitride particle or the boron nitride powder and a resin.

Far still another aspect of the present invention is a method for producing a resin composition, including a step of preparing the boron nitride particle or the boron nitride powder and a step of mixing the boron nitride particle or the boron nitride powder with a resin. This method for producing a resin composition may further include a step of pulverizing the boron nitride particle or the boron nitride powder.

Advantageous Effects of Invention

According to one aspect of the present invention, it is possible to provide a new boron nitride particle and a new boron nitride powder.

DESCRIPTION OF EMBODIMENTS

Figure 1:
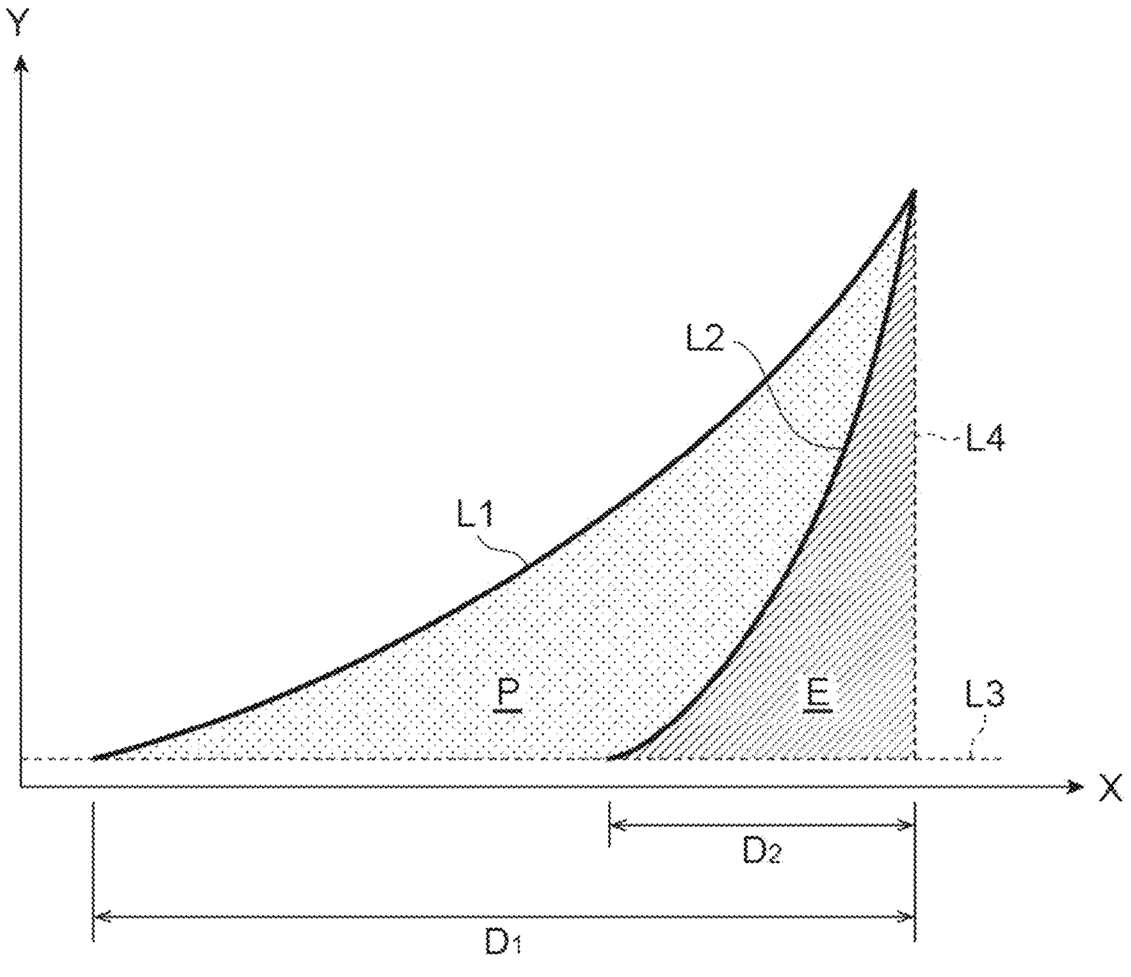
FIG. 1 is a schematic view showing a relationship between a load amount and displacement amounts of boron nitride particles when the boron nitride particle is subjected to a loading and unloading test.

Hereinafter, an embodiment of the present invention will be described in detail.

First Embodiment: Boron Nitride Particle

One embodiment (a first embodiment) of the present invention is a boron nitride particle having a long and thin shape. The boron nitride particle having a long and thin shape may have an aspect ratio of, for example, 1.5 or more. The aspect ratio of the boron nitride particle may be 1.6 or more, 1.7 or more, 1.8 or more, 1.9 or more, 2.0 or more, 2.5 or more or 3.0 or more and may be 12.0 or less, 10.0 or less, 9.5 or less, 9.0 or less, or 8.0 or less.

The aspect ratio of the boron nitride particle is defined as the ratio ($L_a/L_b$) of the maximum length ($L_a$) of the boron nitride particle to the maximum length ($L_b$) of the boron nitride particle in a direction perpendicular to a direction where the maximum length is present. The maximum length ($L_a$) of the boron nitride particle means the length of the maximum one of direct distances between two arbitrary points on one boron nitride particle when the boron nitride particle is observed with a microscope. The microscope may be, for example, a microscope attached to a microcompression tester (for example, manufactured by Shimadzu Corporation, MCT series). The maximum length ($L_a$) may be measured by importing an observation image into image analyzing software (for example, software attached to the microcompression tester). The maximum length ($L_b$) of the boron nitride particle in the direction perpendicular to the direction where the maximum length is present can be measured by the same method as for the maximum length ($L_a$).

As the aspect ratio of the boron nitride particle increases, the shape of the boron nitride particle becomes longer and thinner. Therefore, when a heat dissipation material has been produced by, for example, mixing the boron nitride particles with a resin, the boron nitride particles are likely to overlap each other. Furthermore, when a boron nitride particle having a long and thin shape overlaps another boron nitride particle, it is considered that the boron nitride particle having a long and thin shape overlaps another so as to be inclined. Therefore, it is considered that the number of the particles that are lined up in the thickness direction of the heat dissipation material becomes small, and heat transfer loss between the boron nitride particles becomes small, and thus the thermal conductivity of the heat dissipation material is superior.

The maximum length ($L_a$) of the boron nitride particle may be 80 μm or longer, 100 μm or longer, 125 μm or longer, 150 μm or longer, 175 μm or longer, 200 μm or longer, 225 μm or longer, 250 μm or longer, 275 μm or longer or 300 μm or longer and may be 500 μm or shorter or 400 μm or shorter.

The maximum length ($L_b$) of the boron nitride particle in the direction perpendicular to the direction where the maximum length ($L_a$) of the boron nitride particle is present may be 50 μm or longer, 60 μm or longer, 70 μm or longer or 80 μm or longer and may be 300 μm or shorter, 200 μm or shorter, 150 μm or shorter or 100 μm or shorter.

The external appearance shape of the boron nitride particle is not particularly limited as long as the external appearance shape is a long and thin shape. The boron nitride particle may have a fixed shape or an irregular shape. Examples of the external appearance shape of the boron nitride particle include a spheroid shape, a rod shape, a dumbbell shape and the like. The boron nitride particle may have, for example, a branched structure that is branched in two or more directions.

The boron nitride particle may be solid or hollow. In a case where the boron nitride particle is hollow, the boron nitride particle may have a shell part formed of boron nitride and a hollow part surrounded by the shell part. The hollow part may extend along the longitudinal direction of the boron nitride particle. That is, the boron nitride particle may have a tubular shape. In this case, at least one of the end portions of the boron nitride particle in the longitudinal direction may be an open end or all of the end portions may be open ends. The open end may communicate with the above-described hollow part. In a case where the boron nitride particle is hollow, and at least one of the end portions of the boron nitride particle in the longitudinal direction is an open end, for example, when the boron nitride particle is mixed with a resin and used as a heat dissipation material, the resin that weighs less than the boron nitride particle is loaded into the hollow part, whereby not only improvement in the thermal conductivity of the heat dissipation material but also the weight reduction of the heat dissipation material can also be expected.

The boron nitride particle of the present embodiment is a boron nitride particle having a long and thin shape, in which, when the boron nitride particle is subjected to a loading and unloading test including a loading step and unloading step in this order, at least a part of a length in the lateral direction of the boron nitride particle compressed in the loading step returns in the unloading step, in which the loading step includes gradually applying a load from 0.2 mN up to 20 mN at a loading rate of 0.27 mN/second in a lateral direction of the boron nitride particle to compress the boron nitride particle, and the unloading step includes gradually unloading the boron nitride particle to 0.2 mN at an unloading rate of 0.27 mN/second.

In the loading step, first, the boron nitride particle is installed on a specimen table. At this time, the boron nitride particle is installed such that the longitudinal direction of the boron nitride particle is along an installation surface of the specimen table. Subsequently, the indenter (for example, the indenter diameter of 200 μm) of a microcompression tester (for example, manufactured by Shimadzu Corporation, MCT series) is lowered toward one boron nitride particle on the specimen table to gradually apply a load to the boron nitride particle from 0.2 mN up to 20 mN at a loading rate of 0.27 mN/second. At this time, the magnitudes of the displacement (displacement amounts) of the boron nitride particle with respect to the applied loads (load amounts) are measured.

In the unloading step, unloading is slowly performed to 0.2 mN at an unloading rate of 0.27 mN/second from a state where the load (20 mN) has been applied to the boron nitride particle in the loading step. At this time as well, the displacement amounts of the boron nitride particle with respect to the load amounts are measured. The time from the completion of the loading step to the start of the unloading step (while the state where a load of 20 mN has been applied to the boron nitride particle is maintained) is set to five seconds or shorter.

An example of the relationship between the load amount and the displacement amount of the boron nitride particle when the boron nitride particle is subjected to the loading and unloading test is shown in FIG. 1. As shown in FIG. 1, when the displacement amount of the boron nitride particle is indicated by X, and the load amount is indicated by Y, for example, the displacement amount X of the boron nitride particle and the load amount Y in the loading step becomes a relationship like a loading curve L1, and the displacement amount X of the boron nitride particle and the load amount Y in the unloading step becomes a relationship like an unloading curve L2.

When $D_1$ is the amount (absolute value) of the boron nitride particle displaced in the lateral direction in the loading step, and $D_2$ is the amount (absolute value) of the boron nitride particle displaced in the lateral direction in the unloading step, the fact that at least a part of the length in the lateral direction of the boron nitride particle compressed in the loading step returns in the unloading step means $D_2>0$. In addition, the recovery rate ($D_2/D_1$) that indicates how much the compressed boron nitride particle returns in the unloading step is preferably as large as possible. The recovery rate ($D_2/D_1$) may be, for example, 0.2 or more, 0.25 or more, 0.3 or more, 0.35 or more or 0.4 or more.

The recovery rate being large can also be rephrased as the elastic deformation work ratio of the boron nitride particle being large. That is, as the elastic deformation work ratio of the boron nitride particle becomes larger, the boron nitride particle is more likely to return to the original shape even when compressed. The elastic deformation work ratio of the boron nitride particle may be, for example, 0.1 or more, 0.15 or more, 0.2 or more, 0.25 or more, 0.3 or more or 0.35 or more.

The elastic deformation work ratio of the boron nitride particle is defined as described below. That is, as shown in FIG. 1, when the area of a region P that is surrounded by the loading curve L1, the unloading curve L2 and a straight line L3 indicating Y=0.2 mN is regarded as a plastic deformation work amount $W_p$, the area of a region E that is surrounded by the unloading curve L2, the straight line L3 and a straight line L4 that connects the intersection point of the loading curve L1 and the unloading curve L2 and the straight line L3 and is parallel to the Y axis is regarded as an elastic deformation work amount $W_E$, and the total ($W_P+W_E$) of $W_P$ and $W_E$ is regarded as a total work amount $W_T$, the elastic deformation work ratio is defined as the ratio ($W_T/W_T$) of the elastic deformation work amount $W_E$ to the total work amount $W_T$.

Even in the case of being deformed by a load applied from the outside, the boron nitride particle according to one embodiment returns to a shape that is similar to the original shape when unloaded. Therefore, for example, when the boron nitride particle has been mixed with a resin and molded into a sheet shape to produce a heat dissipation material, even in a case where the boron nitride particle is deformed during the mixing with the resin or during the molding into the heat dissipation material, the boron nitride particle returns to a shape that is similar to the original shape afterwards. Therefore, this boron nitride particle is likely to maintain a heat conduction path in the heat dissipation material compared with a conventional boron nitride particle. Additionally, this boron nitride particle has a long and thin shape and is thus also capable of particularly enhancing the thermal conductivity in a specific direction in the heat dissipation material. Therefore, this boron nitride particle can be suitably used as heat dissipation materials. As the use of the boron nitride particle, the heat dissipation material has been exemplified, but this boron nitride particle can be used in a variety of uses without being limited to heat dissipation materials.

Second Embodiment: Boron Nitride Powder

Another embodiment (second embodiment) of the present invention is a boron nitride powder that is an aggregate of boron nitride particles each having a long and thin shape (a powder composed of a plurality of boron nitride particles each having a long and thin shape). In the boron nitride powder according to the second embodiment, each boron nitride particle may be the above-described boron nitride particle according to the first embodiment.

The boron nitride powder according to the second embodiment may be a boron nitride powder, in which, when the boron nitride powder is subjected to a loading and unloading test including the following steps (1) to (3) in this order, at least a part of the length in the lateral direction of the boron nitride particle B compressed in the loading step returns in the unloading step:

(1) a calculation step of measuring the magnitude of a load necessary to crush each of 10 boron nitride particles A that are selected from the boron nitride powder by applying a load at a loading rate of 0.27 mN/second in the lateral direction of the boron nitride particles A and calculating the average value F of the magnitudes of the loads, (2) a loading step of gradually applying a load from 0.2 mN up to a magnitude of 50% of the average value F of the magnitudes of the loads at a loading rate of 0.27 mN/second in the lateral direction of each of the boron nitride particles B that is selected from the boron nitride powder separately from the boron nitride particle A to compress the boron nitride particle B, and (3) an unloading step of gradually unloading the boron nitride particle B to 0.2 mN at an unloading rate of 0.27 mN/second.

In the calculation step, first, 10 or more boron nitride particles that are selected from the boron nitride powder are installed on a specimen table. At this time, the boron nitride particles are installed such that the longitudinal direction of each boron nitride particle is along an installation surface of the specimen table. Subsequently, the indenter (for example, the indenter diameter of 200 μm) of a microcompression tester (for example, manufactured by Shimadzu Corporation, MCT series) is lowered toward one boron nitride particle on the specimen table to apply a load at a loading rate of 0.27 mN/second. In addition, the magnitude of a load when the displacement amount of the boron nitride particle in the lateral direction abruptly increases is measured as the magnitude of a load necessary to crush the boron nitride particle. This measurement is performed in the same manner on the 10 boron nitride particles (these boron nitride particles will be referred to as the boron nitride particles A), and the average value F (mN) of the magnitudes of the loads necessary to crush the boron nitride particles A is calculated.

Subsequently, the loading step is performed in the same manner as described in the first embodiment on boron nitride particles that are selected from the boron nitride powder separately from the boron nitride particles A (these boron nitride particles will be referred to as the boron nitride particles B). Here, the loading step in the second embodiment is different from the loading step in the first embodiment in terms of the fact that a load is gradually applied from 0.2 mN to 50% of the average value F (mN) calculated in the calculation step to the boron nitride particles B at a loading rate of 0.27 mN/second. After that, the unloading step is performed in the same manner as described in the first embodiment on the boron nitride particles B. In the loading step and the unloading step, the displacement amounts of the boron nitride particles B with respect to the load amounts are measured in the same manner as described in the first embodiment.

An example of the relationship between the load amount and the displacement amounts of the boron nitride particles B when the boron nitride particles B are subjected to the loading and unloading test is shown in FIG. 1 in the same manner as described in the first embodiment. As shown in FIG. 1, when the displacement amounts of the boron nitride particles B are indicated by X, and the load amount is indicated by Y, for example, the displacement amounts X of the boron nitride particles B and the load amount Y in the loading step becomes a relationship like a loading curve L1, and the displacement amounts X of the boron nitride particles B and the load amount Y in the unloading step becomes a relationship like an unloading curve L2.

When $D_3$ is the average value (average displacement amount) of the amounts (absolute values) of the boron nitride particles B displaced in the lateral direction in the loading step, and $D_4$ is the average value (average displacement amount) of the amounts (absolute values) of the boron nitride particles B displaced in the lateral direction in the unloading step, the average recovery rate ($D_4/D_3$) is preferably as large as possible. The average recovery rate ($D_4/D_3$) may be, for example, 0.2 or more, 0.25 or more, 0.3 or more, 0.35 or more or 0.4 or more. The average displacement amount $D_3$ and the average displacement amount $D_4$ mean the average values of the displacement amounts $D_1$ and the displacement amounts $D_2$ measured in the same manner as described in the first embodiment from 10 boron nitride particles B, respectively.

The average recovery rate being large can also be rephrased as the average elastic deformation work ratio of the boron nitride particles B being large. That is, as the average elastic deformation work ratio of the boron nitride particles B becomes larger, the boron nitride particles B are more likely to return to the original shape even when compressed. The average elastic deformation work ratio of the boron nitride particles B may be, for example, 0.1 or more, 0.15 or more, 0.2 or more, 0.25 or more, 0.3 or more or 0.35 or more. The average elastic deformation work ratio means the average value of the elastic deformation work ratios ($W_E/W_T$) measured in the same manner as described in the first embodiment from 10 boron nitride particles B.

Subsequently, a method for producing the above-described boron nitride particle will be described below. The above-described boron nitride particle can be produced by, for example, a method for producing a boron nitride particle including a step of disposing a mixture and a base material in a container formed of a carbon material, in which the mixture includes boron carbide and boric acid, and the base material is formed of a carbon material (disposition step) and a step of generating a boron nitride particle on the base material by performing heating and pressurization with a nitrogen atmosphere formed in the container (generation step). Another embodiment of the present invention is such as method for producing a boron nitride particle.

The container formed of a carbon material is a container capable of accommodating the mixture and the base material. The container may be, for example, a carbon crucible. The container is preferably a container airtightness of which can be enhanced by covering an open part with a lid. In the disposition step, for example, the mixture may be disposed on a bottom part of the container, and the base material may be disposed so as to be fixed to a side wall surface in the container or to the inside of the lid. The base material formed of a carbon material may have, for example, a sheet shape, a plate shape or a rod shape. The base material formed of a carbon material may be, for example, a carbon sheet (graphite sheet), a carbon plate or a carbon rod.

The boron carbide in the mixture may be, for example, in a powder form (boron carbide powder). The boric acid in the mixture may be, for example, in a powder form (boric acid powder). The mixture can be obtained by, for example, mixing a boron carbide powder, a boron nitride powder and a boric acid powder by a well-known method.

The boron carbide powder can be produced by a well-known production method. Examples of the method for producing the boron carbide powder include a method in which boric acid and acetylene black are mixed together and then heated at 1800° ° C. to 2400° ° C. for one to 10 hours in an inert gas (for example, nitrogen gas) atmosphere, thereby obtaining a massive boron carbide particle. The boron carbide powder can be obtained by appropriately performing pulverization, shieving, washing, impurity removal, drying and the like on the massive boron carbide particle obtained by this method.

The average particle diameter of the boron carbide powder can be adjusted by adjusting the pulverization time of the massive boron carbide particle. The average particle diameter of the boron carbide powder may be 5 μm or more, 7 μm or more or 10 μm or more and may be 100 μm or less, 90 μm or less, 80 μm or less or 70 μm or less. The average particle diameter of the boron carbide powder can be measured by a laser diffraction and scattering method.

The mixing ratio between the boron carbide and the boric acid can be appropriately selected. From the viewpoint of the boron nitride particle being likely to become large, the content of the boric acid in the mixture is, with respect to 100 parts by mass of the boron carbide, preferably 2 parts by mass or more, more preferably 5 parts by mass or more and still more preferably 8 parts by mass or more and may be 100 parts by mass or less, 90 parts by mass or less or 80 parts by mass or less.

The mixture containing boron carbide and boric acid may further contain other components. Examples of the other components include silicon carbide, carbon, iron oxide and the like. When the mixture containing boron carbide and boric acid further contains silicon carbide, it becomes easy to obtain a boron nitride particle having no open end.

In the container, for example, a nitrogen atmosphere containing 95 vol % or more of nitrogen gas has been formed. The content of the nitrogen gas in the nitrogen atmosphere is preferably 95 vol % or more and more preferably 99.9 vol % or more and may be substantially 100 vol %. In the nitrogen atmosphere, not only the nitrogen gas but also ammonia gas or the like may be contained.

From the viewpoint of the boron nitride particle being likely to become large, the heating temperature is preferably 1450° ° C. or higher, more preferably 1600° C. or higher and still more preferably 1800° ° C. or higher. The heating temperature may be 2400° ° C. or lower, 2300° ° C. or lower or 2200° ° C. or lower.

From the viewpoint of the boron nitride particle being likely to become large, the pressure at the time of the pressurization is preferably 0.3 MPa or higher and more preferably 0.6 MPa or higher. The pressure at the time of the pressurization may be 1.0 MPa or lower or 0.9 MPa or lower.

From the viewpoint of the boron nitride particle being likely to become large, the time for performing the heating and the pressurization is preferably three hours or longer and more preferably five hours or longer. The time for performing the heating and the pressurization may be 40 hours or shorter or 30 hours or shorter.

According to this production method, the above-described boron nitride particles are generated on the base material formed of a carbon material. Therefore, boron nitride particles can be obtained by collecting the boron nitride particles on the base material. The fact that the particles generated on the base material are boron nitride particles can be confirmed from the fact that a peak derived from boron nitride is detected when some of the particles generated on the base material are collected from the base material and X-ray diffraction measurement is performed on the collected particles.

A step of classifying the boron nitride particles obtained as described above so that only a boron nitride particle having a maximum length in a specific range can be obtained (classification step) may also be performed.

The boron nitride particle obtained as described above can be mixed with a resin and used as a resin composition. That is, still another embodiment of the present invention is a resin composition containing the boron nitride particle and a resin.

Examples of the resin include an epoxy resin, a silicone resin, silicone rubber, an acrylic resin, a phenolic resin, a melamine resin, a urea resin, an unsaturated polyester, a fluorine resin, a polyimide, a polyamide-imide, polyetherimide, polybutylene terephthalate, polyethylene terephthalate, polyphenylene ether, polyphenylene sulfide, wholly aromatic polyester, polysulfone, a liquid crystal polymer, polyethersulfone, polycarbonate, a maleimide-modified resin, an ABS (acrylonitrile-butadiene-styrene) resin, an AAS (acrylonitrile-acrylic rubber styrene) resin, an AES (acrylonitrile ethylene propylene diene rubber styrene) resin and the like.

In the case of using the resin composition as a heat dissipation material, from the viewpoint of improving the thermal conductivity of the heat dissipation material and easily obtaining excellent heat dissipation performance, the content of the boron nitride particles may be 15 vol % or more, 20 vol % or more, 30 vol % or more, 40 vol % or more, 50 vol % or more or 60 vol % or more based on the total volume of the resin composition. From the viewpoint of suppressing the generation of voids at the time of molding the resin composition into a sheet-like heat dissipation material and being capable of suppressing the degradation of the insulating properties and mechanical strength of the sheet-like heat dissipation material, the content of the boron nitride particles may be 85 vol % or less or 80 vol % or less based on the total volume of the resin composition.

The content of the resin may be appropriately adjusted depending on the use, required characteristics or the like of the resin composition. The content of the resin may be, for example, 15 vol % or more, 20 vol % or more, 30 vol % or more, 40 vol % or more, 50 vol % or more or 60 vol % or more and may be 85 vol % or less, 70 vol % or less, 60 vol % or less, 50 vol % or less or 40 vol % or less based on the total volume of the resin composition.

The resin composition may further contain a curing agent that cures the resin. The curing agent is appropriately selected depending on the kind of the resin. Examples of the curing agent that can be used together with an epoxy resin include phenol novolac compounds, acid anhydrides, amino compounds, imidazole compounds and the like. The content of the curing agent may be, for example, 0.5 parts by mass or more or 1.0 part by mass or more and may be 15 parts by mass or less or 10 parts by mass or less with respect to 100 parts by mass of the resin.

The resin composition may further contain other components. The other components may be a curing accelerator (curing catalyst), a coupling agent, a wetting and dispersing additive, a surface conditioner and the like.

Examples of the curing accelerator (curing catalyst) include phosphorus-based curing accelerators such as tetraphenylphosphonium tetraphenylborate and triphenylphosphate, imidazole-based curing accelerators such as 2-phenyl-4,5-dihydroxymethylimidazole, amine-based curing accelerators such as boron trifluoride monoethylamine and the like.

Examples of the coupling agent include a silane-base coupling agent, a titanate-based coupling agent, an aluminate-based coupling agent and the like. Examples of a chemical bonding group that is contained in these coupling agents include a vinyl group, an epoxy group, an amino group, a methacrylic group, a mercapto group and the like.

Examples of the wetting and dispersing additive include phosphate ester salt, carboxylate ester, polyester, acrylic copolymers, block copolymers and the like.

Examples of the surface conditioner include an acrylic surface conditioner, a silicone-based surface conditioner, a vinyl-based surface conditioner, a fluorine-based surface conditioner and the like.

The resin composition can be produced by, for example, a method for producing a resin composition including a step of preparing the boron nitride particle according to one embodiment or the boron nitride powder according to one embodiment (preparation step) and a step of mixing the boron nitride particle or the boron nitride powder with a resin (mixing step). Far still another embodiment of the present invention is such a method for producing a resin composition. In the mixing step, in addition to the boron nitride particle and the resin, the above-described curing agent or the other components may be further mixed therewith.

The method for producing a resin composition according to one embodiment may further include a step of pulverizing the boron nitride particle or the boron nitride powder (pulverization step). The pulverization step may be performed between the preparation step and the mixing step or may be performed at the same time as the mixing step (the boron nitride particle or the boron nitride powder may be pulverized at the same time as the mixing of the boron nitride particle or the boron nitride powder with the resin).

The resin composition can be used as, for example, a heat dissipation material. The heat dissipation material can be produced by, for example, curing the resin composition. A method for curing the resin composition is appropriately selected depending on the kind of the resin (and the curing agent that is used as necessary) contained in the resin composition. For example, in a case where the resin is an epoxy resin and the above-described curing agent is used together, the resin can be cured by heating.

EXAMPLES

Hereinafter, the present invention will be more specifically described using examples. However, the present invention is not limited to the following examples.

<Production of Boron Nitride Particle (Powder)>

Massive boron carbide particles were pulverized with a pulverizer, and a boron carbide powder having an average particle diameter of 10 μm was obtained. 100 Parts by mass of the obtained boron carbide powder and 9 parts by mass of boric acid were mixed together, the obtained mixture was loaded into a carbon crucible, an open part of the carbon crucible was covered with a carbon sheet (manufactured by NeoGraf Solutions), and the carbon sheet was sandwiched by a lid of the carbon crucible and the carbon crucible to fix the carbon sheet. The carbon crucible covered with the lid was heated in a nitrogen gas atmosphere under conditions of 2000° ° C. and 0.85 MPa for 10 hours in a resistance heating furnace, whereby particles were generated on the carbon sheet.

Figure 2:
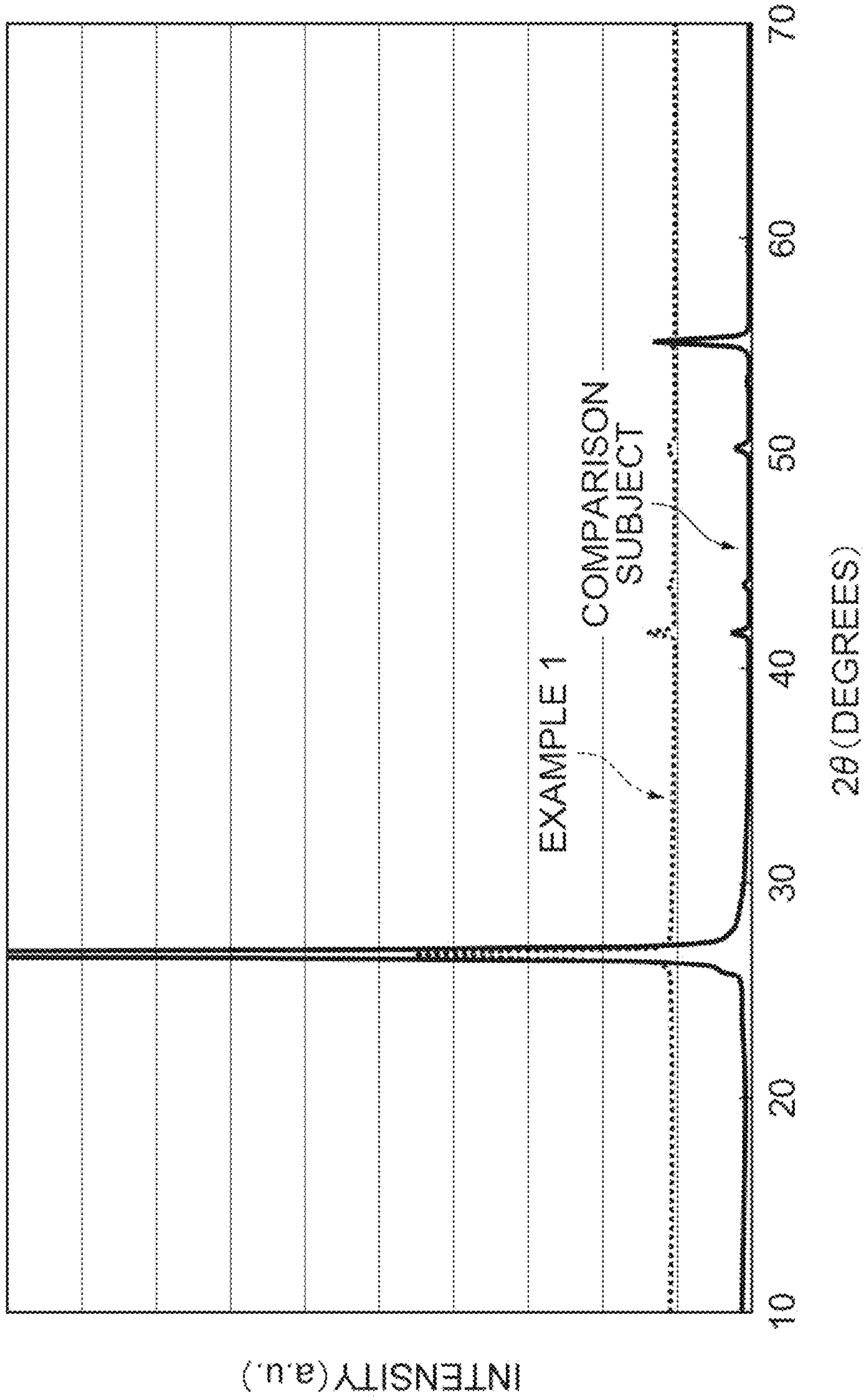
FIG. 2 is a graph of X-ray diffraction measurement results of boron nitride particles of Example 1.
Figure 3:
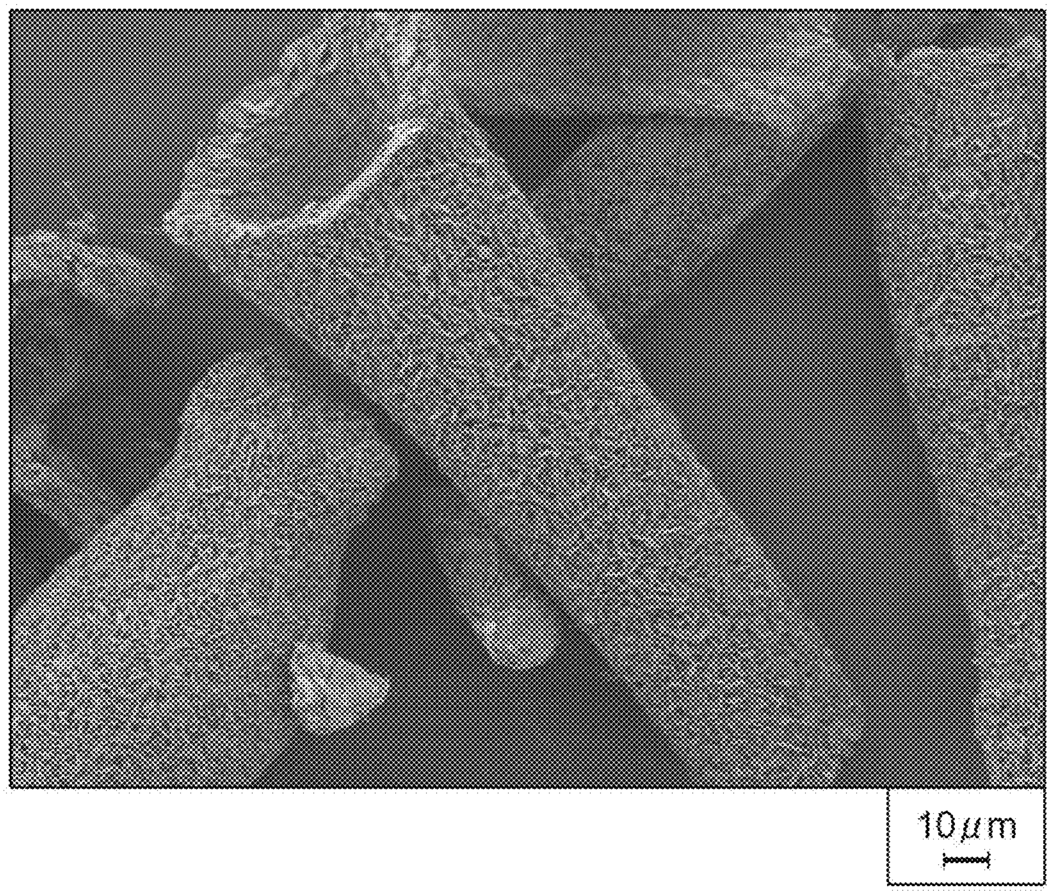
FIG. 3 is a SEM image of the boron nitride particles of Example 1.

Some of the particles generated on the carbon sheet were collected and measured by X-ray diffraction using an X-ray diffractometer (manufactured by Rigaku Corporation, "ULTIMA-IV"). This X-ray diffraction measurement result and the X-ray diffraction measurement result of a boron nitride powder (GP grade) manufactured by Denka Company Limited as a comparison subject are each shown in FIG. 2. As is clear from FIG. 2, only a peak derived from boron nitride was detected, and it was possible to confirm that boron nitride particles were generated. A SEM image of the obtained boron nitride powder is shown in FIG. 3.

<Evaluation of Boron Nitride Particles>

10 Boron nitride particles A in the obtained boron nitride powder were crushed by gradually applying a load to each of the boron nitride particles A in the lateral direction at a loading rate of 0.27 mN/second using a microcompression tester (manufactured by Shimadzu Corporation, MCT series). The average value F of the magnitudes of loads necessary to crush the individual boron nitride particles A was 40 mN.

Subsequently, 10 boron nitride particles B separate from the boron nitride particles A in the obtained boron nitride powder were each observed with a microscope attached to the microcompression tester (manufactured by Shimadzu Corporation, MCT series), thereby measuring the maximum length ($L_a$) and the maximum length ($L_b$) of the boron nitride particles in a direction perpendicular to a direction where the maximum length ($L_a$) was present. In addition, the aspect ratio ($L_a/L_b$) was calculated from the measured maximum lengths $L_a$ and $L_b$. The results are shown in Table 1.

Figure 4:
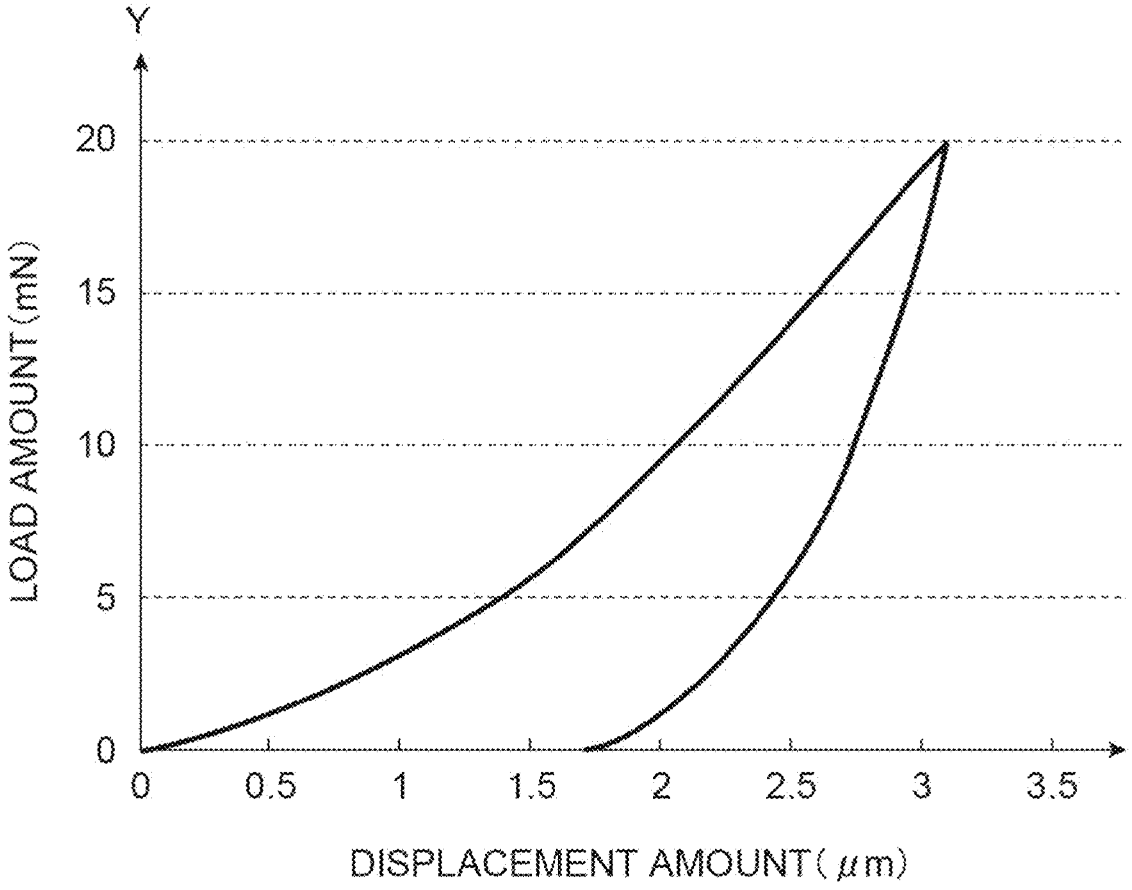
FIG. 4 is a graph showing a relationship between a load amount and a displacement amount of a boron nitride particle B (particle No. 1) of Example 1 when the boron nitride particle is subjected to a loading and unloading test.

In addition, using the microcompression tester (manufactured by Shimadzu Corporation, MCT series), a load was gradually applied to each of the 10 boron nitride particles B from 0.2 mN to 20 mN (50% of the average value F (40 mN) of the magnitudes of the loads necessary to crush the boron nitride particles A) in the lateral direction at a loading rate of 0.27 mN/second to compress the boron nitride particle (loading step) and then the boron nitride particle was unloaded to 0.2 mN at an unloading rate of 0.27 mN/second (unloading step). For one (particle No. 1) of the boron nitride particles B that was subjected to the loading and unloading test, the relationship between the load amount and the displacement amounts of the boron nitride particles in the loading and unloading test is shown in FIG. 4.

For each of the 10 boron nitride particles B, the displacement amounts $D_1$ in the lateral direction of the boron nitride particles in the loading step, the displacement amounts $D_2$ from the lengths in the lateral direction of the boron nitride particles in the unloading step and the recovery rate $D_2/D_1$ were calculated. In addition, for each of the 10 boron nitride particles B, an elastic deformation work ratio $W_E/W_T$ was calculated when the area of a region P that is surrounded by a loading curve L1, an unloading curve L2 and a straight line L3 indicating Y=0.2 mN, which are shown in FIG. 1, was regarded as a plastic deformation work amount $W_p$, the area of a region E that is surrounded by the unloading curve L2, the straight line L3 and a straight line L4 that connects the intersection point of the loading curve L1 and the unloading curve L2 and the straight line L3 and is parallel to the Y axis was regarded as an elastic deformation work amount $W_E$, and the total ($W_P+W_E$) of $W_P$ and $W_E$ was regarded as a total work amount $W_T$. The results are shown in Table 1.

TABLE 1

| Particle No. | $D_1$ (μm) | $D_2$ (μm) | $D_2/D_1$ | $L_a$ (μm) | $L_b$ (μm) | $L_a/L_b$ | $W_x/W_r$ |
|---|---|---|---|---|---|---|---|
| 1 | 2.9 | 1.3 | 0.45 | 342.0 | 94.8 | 3.6 | 0.37 |
| 2 | 3.0 | 1.3 | 0.43 | 291.9 | 74.9 | 3.9 | 0.37 |
| 7 | 4.1 | 1.1 | 0.27 | 278.2 | 82.7 | 3.4 | 0.21 |
| 4 | 3.5 | 1.4 | 0.40 | 281.8 | 85.0 | 3.3 | 0.36 |
| 5 | 4.0 | 1.7 | 0.43 | 290.5 | 81.4 | 3.6 | 0.37 |
| 6 | 4.3 | 2.1 | 0.49 | 287.6 | 83.2 | 3.5 | 0.42 |
| 7 | 3.6 | 1.2 | 0.33 | 271.5 | 84.4 | 3.2 | 0.31 |
| 8 | 6.4 | 1.9 | 0.30 | 266.8 | 80.5 | 3.3 | 0.31 |
| 9 | 4.2 | 1.5 | 0.36 | 276.1 | 89.6 | 3.1 | 0.35 |
| 10 | 3.5 | 1.1 | 0.31 | 273.5 | 72.6 | 3.8 | 0.34 |
| Average value | 4.0 | 1.5 | 0.38 | — | — | — | 0.34 |

The invention claimed is:

1. A hollow boron nitride particle having a long and thin shape, wherein a maximum length (La) of the boron nitride particle is 80 μm or longer, wherein a maximum length ($L_b$) of the boron nitride particle in the direction perpendicular to a direction of a maximum length ($L_a$) of the boron nitride particle is 50 μm or longer, wherein, when the hollow boron nitride particle is subjected to a loading and unloading test comprising a loading step and unloading step in this order, at least a part of a length in the lateral direction of the hollow boron nitride particle compressed in the loading step returns in the unloading step, wherein the loading step comprises gradually applying a load from 0.2 mN up to 20 mN at a loading rate of 0.27 mN/second in a lateral direction of the hollow boron nitride particle to compress the hollow boron nitride particle, and the unloading step comprises gradually unloading the hollow boron nitride particle to 0.2 mN at an unloading rate of 0.27 mN/second.

2. The hollow boron nitride particle according to claim 1, wherein $D_2/D_1$ is 0.2 or more, wherein $D_1$ is an amount of the hollow boron nitride particle displaced in the lateral direction in the loading step, and $D_2$ is an amount of the hollow boron nitride particle displaced in the lateral direction in the unloading step.

3. The hollow boron nitride particle according to claim 1, having:

a shell part formed of boron nitride; and a hollow part surrounded by the shell part.

4. A boron nitride powder that is an aggregate of a plurality of the boron nitride particle having a long and thin shape according to claim 1, wherein, when the boron nitride powder is subjected to a loading and unloading test comprising the following steps (1) to (3) in this order, at least a part of a length in the lateral direction of the boron nitride particles B compressed in the loading step returns in the unloading step:

(1) a calculation step of measuring a magnitude of a load necessary to crush each of 10 boron nitride particles A that are selected from the boron nitride powder by applying a load at a loading rate of 0.27 mN/second in a lateral direction of the boron nitride particles A and calculating an average value F of the magnitudes of the loads, (2) a loading step of by gradually applying a load from 0.2 mN up to a magnitude of 50% of the average value F of the magnitudes of the loads at a loading rate of 0.27 mN/second in a lateral direction of boron nitride particles B that is selected from the boron nitride powder separately from the boron nitride particles A to compress the boron nitride particle B, and (3) an unloading step of gradually unloading the boron nitride particles B to 0.2 mN at an unloading rate of 0.27 mN/second.

5. The boron nitride powder according to claim 4, wherein $D_4/D_3$ is 0.2 or more, wherein $D_3$ is an average value of amounts of the boron nitride particles B displaced in the lateral direction in the loading step, and $D_4$ is an average value of amounts of the boron nitride particles B displaced in the lateral direction in the unloading step.

6. The boron nitride powder according to claim 4, wherein the boron nitride particles each having a long and thin shape each have a shell part formed of boron nitride and a hollow part surrounded by the shell part.

7. A resin composition comprising:

the hollow boron nitride particle according to claim 1; and a resin.

8. A method for producing a resin composition comprising:

a step of preparing the hollow boron nitride particle according to claim 1; and a step of mixing the boron nitride particle with a resin.

9. The method for producing a resin composition according to claim 8, further comprising:

a step of pulverizing the boron nitride particle.

10. A resin composition comprising:

the boron nitride powder according to claim 4; and a resin.

11. A method for producing a resin composition comprising:

a step of preparing the boron nitride powder according to claim 4; and a step of mixing the boron nitride powder with a resin.

12. The method for producing a resin composition according to claim 11, further comprising:

a step of pulverizing the boron nitride powder.

* * * * *